US012110730B2

(12) United States Patent
Konchan et al.

(10) Patent No.: US 12,110,730 B2
(45) Date of Patent: Oct. 8, 2024

(54) VEHICLE CLOSURE CINCHING CONTROL SYSTEMS AND METHODS

(71) Applicant: GM GLOBAL TECHNOLOGY OPERATIONS LLC, Detroit, MI (US)

(72) Inventors: Jeffrey L. Konchan, Romeo, MI (US); Besi Rrumbullaku, Rochester, MI (US); David T. Proefke, Troy, MI (US); Craig A. Kollar, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 636 days.

(21) Appl. No.: 17/315,992

(22) Filed: May 10, 2021

(65) Prior Publication Data

US 2022/0356746 A1 Nov. 10, 2022

(51) Int. Cl.
*E05F 15/70* (2015.01)

(52) U.S. Cl.
CPC ........... *E05F 15/70* (2015.01); *E05Y 2201/43* (2013.01); *E05Y 2400/32* (2013.01);
(Continued)

(58) Field of Classification Search
CPC ................ E05F 15/70–79; E05F 15/00; E05Y 2201/43–446; E05Y 2400/30–42;
(Continued)

(56) References Cited

U.S. PATENT DOCUMENTS 5,632,120 A * 5/1997 Shigematsu ............ E05B 81/66 49/449
5,640,807 A * 6/1997 Shigematsu ............ E05B 81/20 49/449
(Continued)

FOREIGN PATENT DOCUMENTS

DE 102006057889 A1 * 6/2008 .............. E05F 15/70
DE 102021204113 B3 * 8/2022 ............ E05F 15/611
(Continued)

OTHER PUBLICATIONS

Hayami S—English description and claims of JP-2002248070-A via Espacenet Patent Translate, retrieved Mar. 18, 2024. (Year: 2024).*

*Primary Examiner* — Rami Khatib
*Assistant Examiner* — Paul Allen

(57) ABSTRACT

A cinching system includes: a profile configured to determine a first time series of target values for cinching a closure closed; an adjustment module configured to determine an adjustment value based on at least one operating parameter; an adjusting module configured to generate a second time series of target values for cinching of the closure by adjusting at least one of the target values of the first time series based on the adjustment value; and a power control module configured to: apply power to a cinching motor when the closure is partially closed, where the cinching motor is configured to cinch and fully close the closure; and based on a comparison of a measured value of the cinching motor and one of the target values of the second time series, selectively
(Continued)

one of: decrease power applied to the cinching motor; and disconnect the cinching motor from power.

20 Claims, 5 Drawing Sheets

(52) U.S. Cl.
CPC ..... *E05Y 2400/40* (2013.01); *E05Y 2400/445* (2013.01); *E05Y 2900/531* (2013.01); *E05Y 2900/546* (2013.01); *E05Y 2900/548* (2013.01)

(58) Field of Classification Search
CPC ........... E05Y 2400/40; E05B 81/20–22; E05B 81/62; E05B 81/00
USPC ............................................................ 701/49
See application file for complete search history.

(56) References Cited

U.S. PATENT DOCUMENTS

| | | | | |
|---|---|---|---|---|
| 5,723,960 | A * | 3/1998 | Harada | H02H 7/0851 361/57 |
| 10,378,264 | B2 * | 8/2019 | Suzuki | E05F 15/695 |
| 10,920,478 | B2 * | 2/2021 | Conner | E05F 15/70 |
| 2006/0255757 | A1 * | 11/2006 | Sommer | G05B 19/237 318/468 |
| 2007/0247766 | A1 * | 10/2007 | Zeniya | B62D 5/0481 361/25 |
| 2016/0101813 | A1 * | 4/2016 | Ishijima | B62D 5/04 701/41 |
| 2017/0342758 | A1 * | 11/2017 | Grudzinski | B62D 33/0273 |
| 2017/0342761 | A1 * | 11/2017 | Conner | E05F 15/622 |
| 2018/0171679 | A1 * | 6/2018 | Im | E05B 81/34 |
| 2020/0240196 | A1 * | 7/2020 | Kawaguchi | E05F 15/41 |
| 2020/0270913 | A1 * | 8/2020 | Marlia | E05B 81/66 |
| 2022/0243503 | A1 * | 8/2022 | Osmialowski | E05B 77/00 |
| 2022/0268074 | A1 * | 8/2022 | Leonard | E05F 15/41 |
| 2022/0356746 | A1 * | 11/2022 | Konchan | E05F 15/70 |
| 2023/0265706 | A1 * | 8/2023 | Enya | B60J 5/047 49/31 |

FOREIGN PATENT DOCUMENTS

| | | | | |
|---|---|---|---|---|
| JP | 2002248070 A | * | 9/2002 | |
| WO | WO-2020031833 A1 | * | 2/2020 | E05F 15/632 |
| WO | WO-2020254319 A1 | * | 12/2020 | E05F 15/611 |

* cited by examiner

VEHICLE CLOSURE CINCHING CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to closure panels of openings of vehicles and more particularly to systems and methods for cinching of closure panels.

Vehicles include various openings that can be closed via closure panels. For example, vehicles may include two or more door openings that can be closed via doors. A vehicle may include one or more trunk (e.g., front and/or rear) openings that can be closed via trunk closures. A vehicle may include one or more hatch (e.g., rear) openings that can be closed via a hatch closure.

An opening of a vehicle may include a striker that is mounted to the vehicle. A weather strip may surround the opening to seal the opening from weather when the associated closure panel is closed. The closure panel may include a latch that latches the closure panel closed via engaging the striker. The closure panel closes the opening when the closure panel is closed.

SUMMARY

In a feature, a cinching system of a vehicle includes: a profile configured to determine a first time series of target values for cinching a closure of the vehicle closed; an adjustment module configured to determine an adjustment value based on at least one operating parameter; an adjusting module configured to generate a second time series of target values for cinching of the closure by adjusting at least one of the target values of the first time series based on the adjustment value; and a power control module configured to: apply power to a cinching motor when the closure is partially closed, where the cinching motor is configured to cinch and fully close the closure; and based on a comparison of a measured value of the cinching motor and one of the target values of the second time series, selectively one of: decrease power applied to the cinching motor; and disconnect the cinching motor from power.

In further features, the power control module is configured to decrease power applied to the cinching motor when the measured value of the cinching motor is greater than the one of the target values of the second time series by at least a first predetermined amount.

In further features, the power control module is configured to disconnect the cinching motor from power when the measured value of the cinching motor is greater than the one of the target values of the second time series by at least a second predetermined amount.

In further features, the second predetermined amount is greater than the first predetermined amount.

In further features, the operating parameter is a temperature of the cinching motor.

In further features, the adjustment module is configured to increase the adjustment value as the temperature increases.

In further features, the operating parameter includes an orientation of the vehicle.

In further features, the adjustment module is configured to increase the adjustment value when the orientation is indicative of the cinching being uphill.

In further features, the operating parameter includes a temperature within the vehicle.

In further features, the adjustment module is configured to increase the adjustment value as the temperature increases.

In further features, the operating parameter includes a temperature outside of the vehicle.

In further features, the adjustment module is configured to increase the adjustment value as the temperature increases.

In further features, the operating parameter includes a number of cinches of the closure previously performed.

In further features, the adjustment module is configured to decrease the adjustment value as the number of cinches increases.

In further features, the operating parameter includes a period that the closure was open prior to the closure being partially closed.

In further features, the adjustment module is configured to increase the adjustment value as the period that the closure was open increases.

In further features, the operating parameter includes a period that the closure was closed prior to being opened before the partial closure.

In further features, the adjustment module is configured to decrease the adjustment value as the period that the closure was closed increases.

In further features, the closure is one of a trunk panel, a door, and a hatch of the vehicle.

In a feature, a cinching method for a vehicle includes: determining a first time series of target values for cinching a closure of the vehicle closed; determining an adjustment value based on at least one operating parameter; generating a second time series of target values for cinching of the closure by adjusting at least one of the target values of the first time series based on the adjustment value; applying power to a cinching motor when the closure is partially closed, where the cinching motor is configured to cinch and fully close the closure; and based on a comparison of a measured value of the cinching motor and one of the target values of the second time series, selectively one of: decreasing power applied to the cinching motor; and disconnecting the cinching motor from power.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include various closures, such as doors, trunks, and hatches. Cinching of closures may be perceived by vehicle buyers as a luxury feature. Closure cinching involves automatically actuating a closure to a fully closed position from a partially closed position, such as after the closure has been manually moved to the partially closed position. Objects in the path of a closure during cinching, however, may be damaged.

The present application involves monitoring current through a cinching motor that cinches a closure closed during cinching and determining whether the current is greater than a target current. Varying operating conditions may naturally cause current to vary. For example, a greater amount of current may be required to cinch a closure when the closure is being cinched uphill. A greater amount of current may be required to cinch a closure when the closure has been open for a longer period as weather strip around the closure expands while the closure is open. The present application therefore involves determining the target current based on operating parameters, such as vehicle orientation, how long the closure has been open, and other parameters. This more accurately indicates whether one or more objects are in the path of the closure and minimizes false stoppages and/or slowing of cinching.

Figure 1:
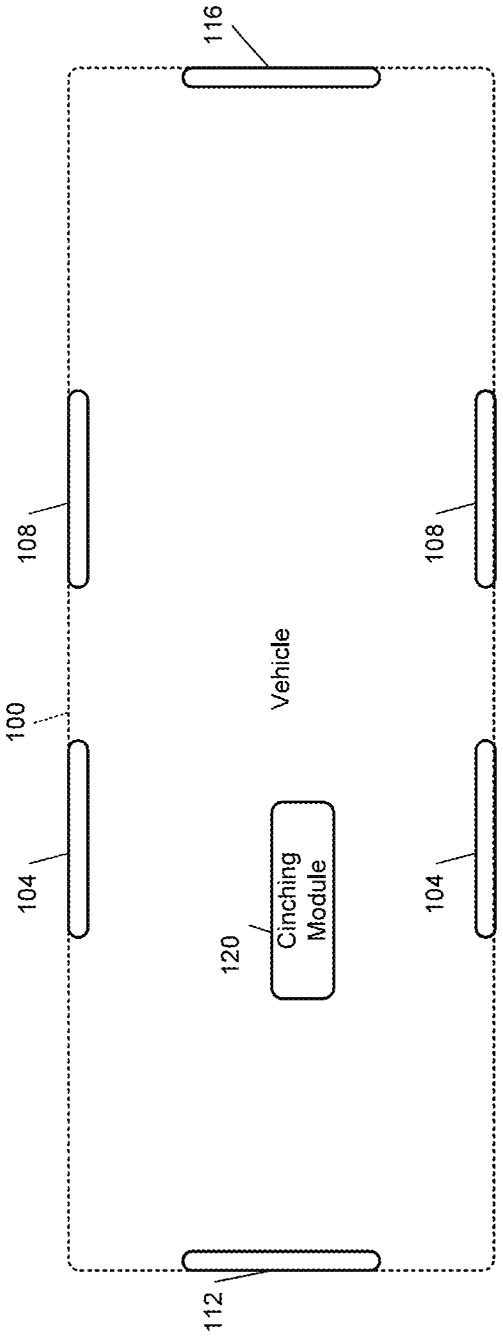
FIG. 1 is a top view of an example vehicle.

FIG. 1 includes a top view of an example vehicle 100. The vehicle 100 may be a land based, a water based, an air based, or a combination of land, water, and/or air based. The vehicle 100 may be an autonomous vehicle, a semi-autonomous vehicle, or a non-autonomous vehicle. The vehicle 100 includes one or more propulsion devices, such as one or more electric motors, one or more internal combustion engines, etc. The propulsion devices propel the vehicle 100. The vehicle 100 may be an electric vehicle including one or more electric motors for propulsion (not including any internal combustion engines), a hybrid vehicle (including at least one electric motor and at least one internal combustion engine, or a non-hybrid vehicle including one or more internal combustion engines (and not including any electric motors for propulsion).

The vehicle 100 includes one or more openings and one or more respective closures. For example, the vehicle 100 includes front (driver and passenger) side door openings and front doors 104. The vehicle 100 may also include rear (driver and passenger) side door openings and rear doors 108. The present application is applicable to manual doors that are actuated by humans, automatic doors that are actuated by a control module (e.g., sliding side doors), and doors that can be actuated by humans and by control modules.

The vehicle 100 may also include one or more hatches and/or trunks and respective closures. For example, the vehicle 100 may include a front hatch or trunk and a front hatch door or trunk 112. The vehicle 100 may include a rear hatch or trunk and a rear hatch door or trunk 116. While example openings and closures are described, the present application is also applicable to other openings and closures of vehicles.

One or more of the closures may be cinched closed after being partially closed to an ajar position, such as by a user. A cinching module 120 controls cinching of the closure(s) to fully closed, as discussed further below.

Figure 2:
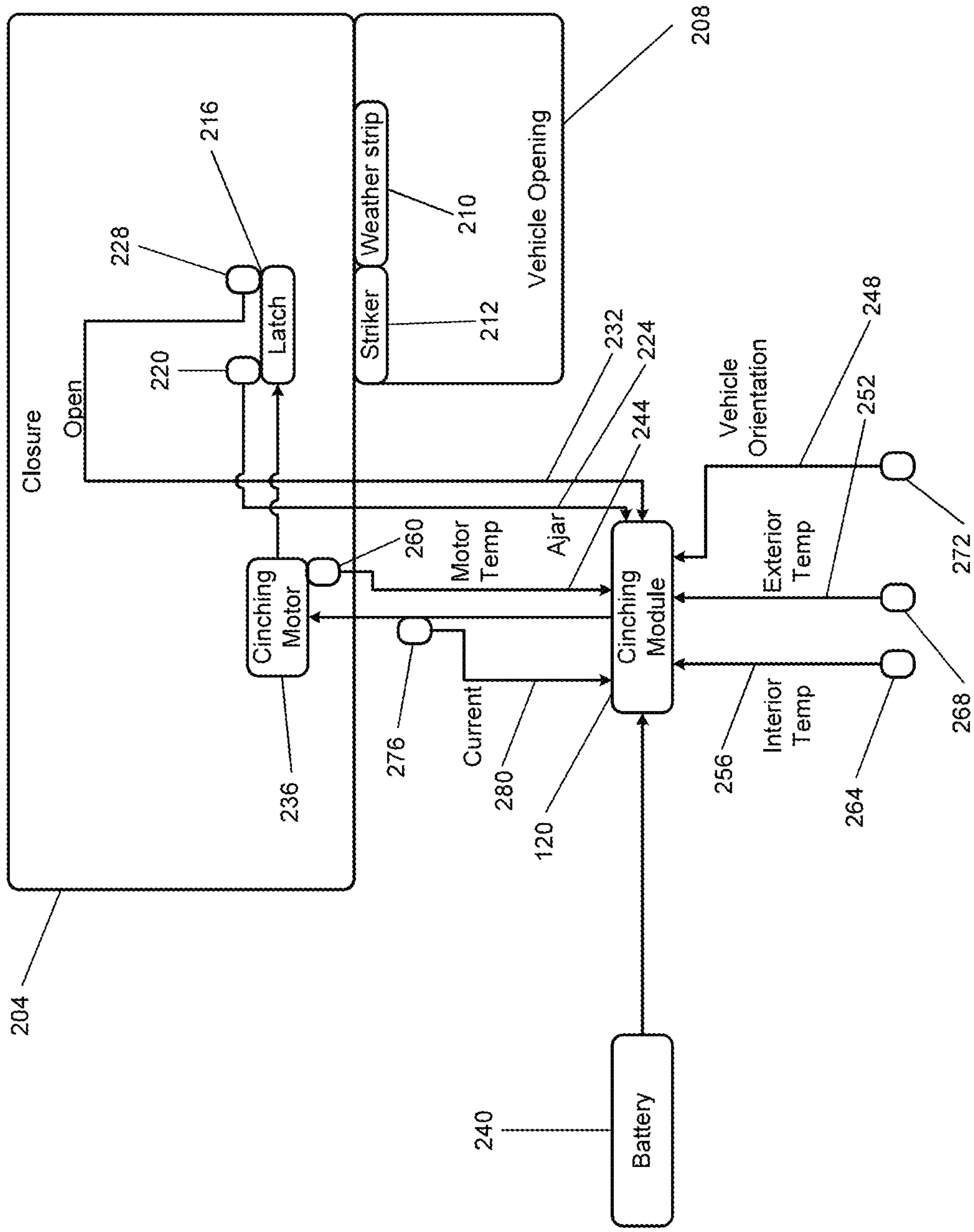
FIG. 2 is a functional block diagram of an example implementation of a cinching system.

FIG. 2 is a functional block diagram of an example implementation of a cinching system. A closure 204, such as a door of an opening, a hatch, or a trunk, is configured to close an associated opening 208. Weather strip 210 is disposed around the opening 208. The weather strip 210 is compressed by the closure 204 when the closure 204 is closed. The weather strip 210 may expand when the opening 208 is open.

A striker 212 is fixed to the vehicle 100, such as within the opening 208. A latch 216 of the closure 204 latches to the striker 212 to close the opening 208 using the closure 204. The closure 204 may be, for example, hinged to the vehicle 100, slide, etc.

A first sensor 220 (e.g., a micro switch) sets a first signal 224 to a first (ajar) state when the closure 204 is partially closed. The first sensor 220 sets the first signal 224 to a second state when the closure 204 is open (not partially or fully closed). A second sensor 228 (e.g., a micro switch) sets a second (open) signal 232 to a first state when closure 204 is fully open. The second sensor 228 sets the second signal 232 to a second state when the closure 204 is not fully open. The closure 204 is fully closed when both of the first and second signals 224 and 232 are in the second state.

A cinching motor 236 actuates the latch 216 to cinch the closure 204 closed. In other words, the cinching motor 236 transitions the closure 204 from partially closed to fully closed. The cinching motor 236 is an electric motor. While the example of the cinching motor 236 actuating the latch 216 to cinch the closure 204 is provided, the present application is also applicable to the cinching motor 236 being disposed outside of the closure 204 and/or actuating the striker 212 to cinch the closure 204. The cinching module 120 applies power to the cinching motor 236 to cinch the closure 204 from a power source, such as a battery 240 of the vehicle. The battery 240 may be, for example, a 12 Volt battery or another suitable power source.

When the first signal 224 transitions from the second state to the first state, the cinching module 120 begins applying power to the cinching motor 236 to cinch the closure 204 closed. The cinching module 120 may apply power to the cinching motor 236 for a predetermined period to cinch the closure 204 closed. Also, when the first signal 224 transitions from the second state to the first state, the cinching module 120 determines a target current profile for cinching the closure 204. The target current profile includes a time series of target current values to accomplish the cinching of the closure 204 when cinching is not obstructed by one or more objects.

The cinching module 120 adjusts the target current profile or one or more of the target current values based on one or more operating parameters as detailed further below. Examples of operating parameters include a motor temperature 244, a vehicle orientation 248, a temperature outside of the vehicle (an exterior temperature) 252, a temperature within the vehicle (interior temperature) 256, a period that the closure 204 was open prior to the first signal 224 transitioning from the second state to the first state, and a period that the closure 204 was opened (e.g., the second signal 232 in the first state), and a number of cinches of the closure 204 that have been performed.

With aging, door cycling, etc., the weather strip 210 may degrade over time, providing less opposing force and thus current to cinch the closure 204 may decrease over time. The current to cinch the closure 204 may therefore decrease as the number of cinches increases. The weather strip 210 may expand when the closure 204 is open. The current to cinch the closure 204 may therefore increase as the period that the closure 204 was open prior to the first signal 224 transitioning from the second state to the first state increases and vice versa. The weather strip 210 is compressed when the closure 204 is fully closed. The current to cinch the closure 204 may therefore decrease as the period that the closure 204 was fully closed increases and vice versa.

The weather strip 210 may be more resilient when the exterior temperature 252 and/or the interior temperature 256 decreases. The current to cinch the closure 204 may therefore increase as the exterior temperature 252 decreases, and vice versa. The current to cinch the closure 204 may therefore increase as the interior temperature 256 decreases, and vice versa. The current to cinch the closure 204 may decrease as the motor temperature 244 increases, and vice versa. The current to cinch the closure 204 may increase when the vehicle orientation 248 indicates that the closure 204 is being cinched uphill, and vice versa.

The motor temperature 244 may be measured using a motor temperature sensor 260 or estimated. The interior temperature 256 may be measured using an interior temperature (e.g., air temperature) sensor 264. The exterior temperature 252 may be measured using an exterior temperature (e.g., air temperature) sensor 268. The vehicle orientation 248 may include a lateral (side-to-side) angle of the vehicle and a longitudinal (front to back) angle of the vehicle. The vehicle orientation 248 may be measured, for example, using one or more gyroscopes and/or accelerometers 272.

A current sensor 276 measures current 280 flow through the cinching motor 236. The cinching module 120 compares the current 280 over time with the target current values during the cinching. If the current 280 at a time is greater than the target current value for that time by at least a first predetermined amount during the cinching, the cinching module 120 may determine that the closure 204 is obstructed by one or more objects and slow the cinching. The cinching module 120 may slow the cinching, for example, by applying less power (e.g., a lower voltage) to the cinching motor 236. If the current 280 at a time is greater than the target current value for that time by at least a second predetermined amount (greater than the first predetermined amount) during the cinching, the cinching module 120 may determine that the closure 204 is obstructed by one or more objects, disconnect the cinching motor 236 from power, and open the latch 216. This may minimize damage to the object(s) obstructing the closure 204.

Figure 3:
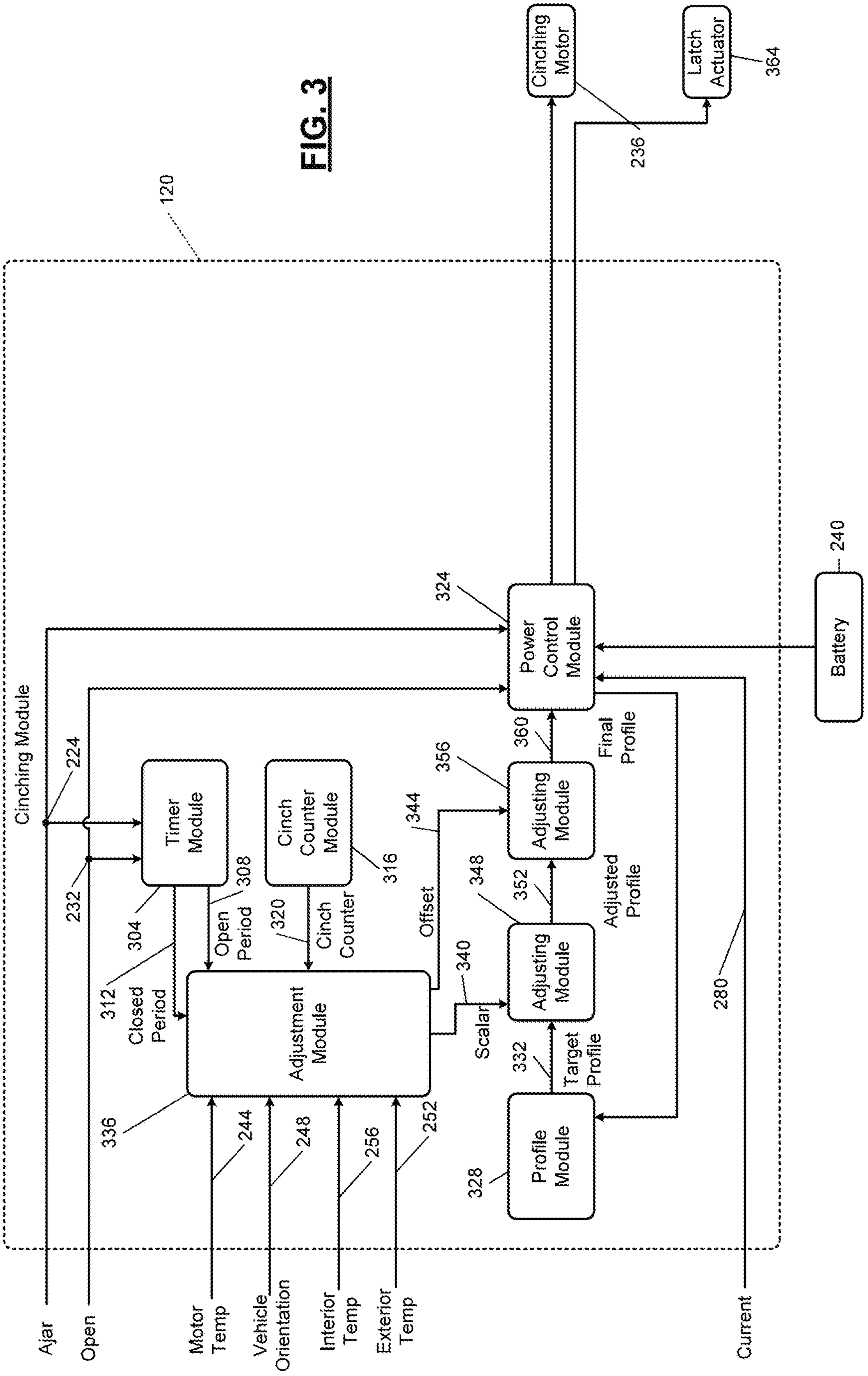
FIG. 3 is a functional block diagram of an example cinching control system.

FIG. 3 is a functional block diagram of an example cinching control system. A timer module 304 monitors the states of the first and second signals 224 and 232. The closure 204 is open the second signal 232 is in the first state. When the second signal 232 transitions to the first state, the timer module 304 resets and starts a timer for an open period 308. The open period 308 tracks the period that the closure 204 has been open since the closure 204 was last closed. When the both of the first and second signals 224 and 232 are in the second state, the closure 204 is fully closed. When the second signal 232 is in the second state and the first signal 224 transitions from the first state to the second state, the timer module 304 resets and starts a timer for a closed period 312. The closed period 312 tracks the period that the closure 204 has been closed since the closure 204 was last open.

A cinch counter module 316 increments a cinch counter value 320 each time that the second signal 232 is in the second state and the first signal 224 transitions from the first state to the second state. In this manner, the cinch counter value 320 tracks a total number of times that the closure 204 has been cinched fully closed.

Figure 4:
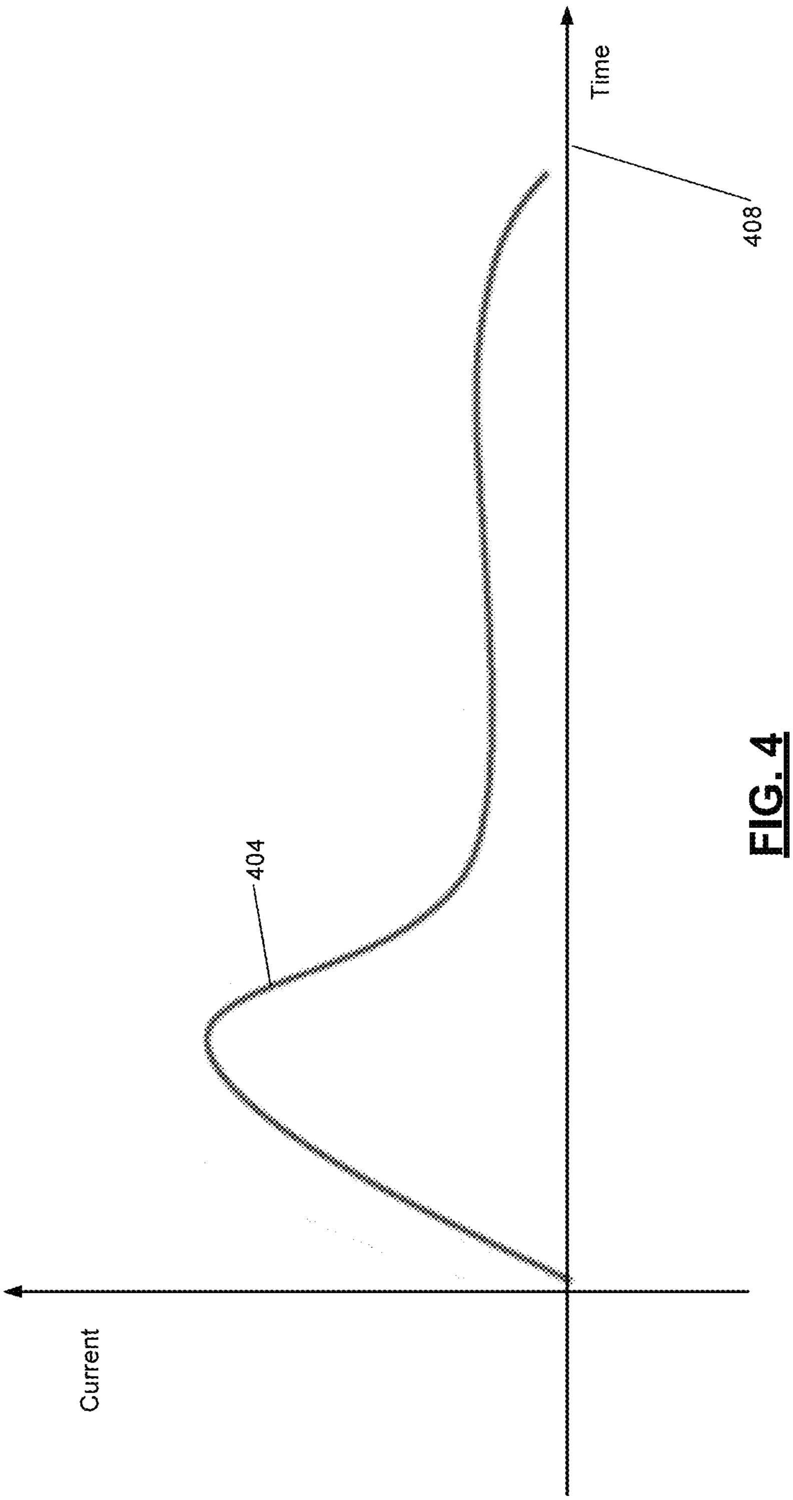
FIG. 4 includes a graph of an example current profile over time for cinching a closure.

A power control module 324 controls the application of power to the cinching motor 236 to cinch the closure 204. When the first signal 224 transitions from the second state to the first state (indicating that the closure 204 is partially closed and the latch 216 is latched to the striker 212, the power control module 324 triggers a profile module 328 to output a target current profile 332 for cinching the closure 204. The target current profile 332 includes a time series of target current values for the cinching to transition the closure 204 to fully closed. FIG. 4 includes a graph of an example current profile 404 over time 408 for cinching the closure 204.

The target current profile 332 may be initialized to a predetermined target current profile when the vehicle is new. Alternatively, a predetermined number (e.g., 5 or more) cinching cycles may be completed, and the profile module 328 may initialize (or learn) the target current profile 332 based on profiles of the current values 280 measured by the current sensor 276 over time during the predetermined number of cinching cycles. After initialization (e.g., when cinching of the closure 204 is complete), the profile module 328 may adjust the target current profile 332 based on a profile of the current values 280 measured by the current sensor 276 over time during the cinching.

An adjustment module 336 determines one or more adjustments for the target current profile 332 based on at least one parameter, such as the motor temperature 336, the vehicle orientation 248, the interior temperature 256, the exterior temperature 252, the open period 308, the closed period 312, and the cinch counter value 320. For example, the adjustment module 336 may determine a scalar value 340 and an offset value 344 based on the at least one parameter. The adjustment module 336 may determine the adjustment(s) using one or more equations and/or lookup tables that relate the parameter(s) to the adjustment(s). The adjustment(s) may be applied to all of the target current values of the target current profile 332 or one or more of the target current values individually. Under some circumstances, given the parameter(s), the adjustment module 336 can set the scalar value 340 to 1.0 to not adjust the target current profile 332. Under some circumstances, given the parameter(s), the adjustment module 336 can set the offset value 344 to 0.0 to not adjust the target current profile 332.

For example, the adjustment module 336 may decrease one or more of the adjustments and current to cinch the closure 204 as the number of cinches increases. The adjustment module 336 may increase one or more of the adjustments as the open period 308 increases and vice versa. The weather strip 210 is compressed when the closure 204 is fully closed. The adjustment module 336 may decrease one or more of the adjustments as the closed period 312 increases and vice versa. The adjustment module 336 may increase one or more of the adjustments as the exterior temperature 252 decreases, and vice versa. The adjustment module 336 may increase one or more of the adjustments as the interior temperature 256 decreases, and vice versa. The adjustment module 336 may decrease one or more of the adjustments as the motor temperature 244 increases, and vice versa. The adjustment module 336 may increase one or more of the adjustments when the vehicle orientation 248 indicates that the closure 204 is being cinched uphill, and vice versa. For example, if the vehicle orientation 248 indicates that the left (driver) side of the vehicle is lower than the right (passenger) side of the vehicle, the adjustment module 336 may increase one or more of the adjustments for a closure on the left side of the vehicle. If the vehicle orientation 248 indicates that the left (driver) side of the vehicle is lower than the right (passenger) side of the vehicle, the adjustment module 336 may decrease one or more of the adjustments for a closure on the right side of the vehicle.

A first adjusting module 348 adjusts the target current profile 332 based on the scalar value 340 to produce an adjusted target current profile 352. For example, the first adjusting module 348 may multiply the scalar value 340 with one, two or more, or all of the target current values of the target current profile 332 to produce the adjusted target current profile 352.

A second adjusting module 356 adjusts the adjusted target current profile 332 based on the offset value 344 to produce a final target current profile 360. For example, the second adjusting module 356 may add the offset value 340 with one, two or more, or all of the target current values of the adjusted target current profile 352 to produce the final target current profile 360. In various implementations, offset value 344 may be used to adjust before the scalar value 340.

When the first signal 224 transitions to the first state from the second state, the power control module 324 begins applying power (e.g., a predetermined voltage) to the cinching motor 236 from the power source, such as the battery 240. The power control module 324 may apply power to the cinching motor 236, for example, until the second signal 228 transitions from the second state to the first state.

The power control module 324 monitors the current 280 and the final target current profile 360 while power is being applied to the cinching motor 236. The power control module 324 compares the current 280 at a time (after power was first applied) with the target current value of the final target current profile 360 at that time. When the current 280 is greater than the target current value by a first predetermined amount and less than a second predetermined amount, the power control module 324 may slow the cinching, such as by reducing the power (e.g., the voltage) applied to the cinching motor 236. When the current 280 is greater than the target current by the second predetermined amount, the power control module 324 may disconnect the cinching motor 236 from power and actuate a latch actuator 364 that unlatches the latch 216. The first and second predetermined amounts may be calibratable and may be, for example, 5 and 10 percent, respectively, of the target value at that time or other suitable values.

Figure 5:
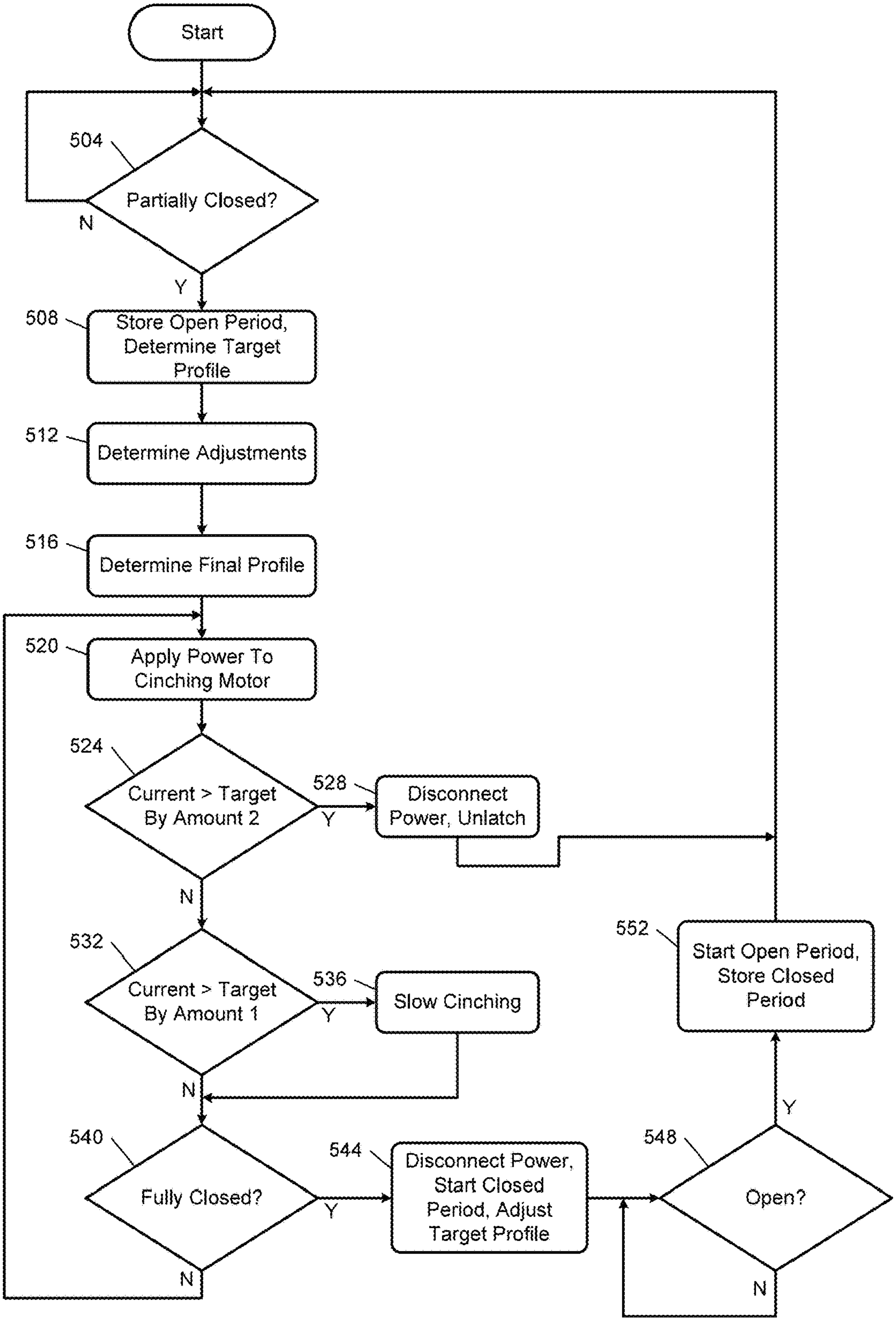
FIG. 5 is a flowchart depicting an example method of controlling cinching of the closure, such as a door, hatch, or trunk panel of a vehicle.

FIG. 5 is a flowchart depicting an example method of controlling cinching of the closure 204, such as a door, hatch, or trunk panel of a vehicle. Control begins with 504 where the power control module 324 determines whether the closure 204 has transitioned to partially closed from being open. For example, the power control module 324 may determine whether the first signal 224 transitioned from the second state to the first state. If 504 is true, control continues with 508. If 504 is false, control may remain at 504.

At 508, the timer module 304 stores the open period 308, which corresponds to the period that the closure 204 has been open since it was last closed. The profile module 328 determines the target current profile 332 at 508. At 512, the adjustment module 336 determines the adjustment(s), such as the scalar value 340 and the offset value 344, based on at least one parameter, such as the open period 308, the last closed period 312, the motor temperature 244, the vehicle orientation 248, the interior temperature 256, the exterior temperature 252, and the cinch counter value 320.

At 516, the adjusting module 348 determines the adjusted target current profile 352 based on the scalar value 340 and the target current profile 332, and the adjusting module 356 determines the final target current profile 360 based on the offset value 344 and the adjusted target current profile 352. At 520, the power control module 324 begins applying power to the cinching motor 236 to fully close the closure 204.

At 524, the power control module 324 determines whether the current at that time (relative to the time when the power control module 324 began to apply power to the cinching motor 236) is greater than the target current value at that time from the final target current profile 360 by at least the second predetermined amount (e.g., 10% of the target current value or another suitable value). If 524 is true, the power control module 324 disconnects the cinching motor 236 from power to stop cinching and actuates the latch actuator 364 to unlatch the latch 216 at 528. Control may return to 504. If 524 is false, control may continue with 532.

At 532, the power control module 324 determines whether the current at that time (relative to the time when the power control module 324 began to apply power to the cinching motor 236) is greater than the target current value at that time from the final target current profile 360 by at least the first predetermined amount (e.g., 5%) of the target current value or another suitable value). If 532 is true, the power control module 324 slows the cinching, such as by decreasing a voltage applied to the cinching motor 236 at 536. Control may continue with 540. If 532 is false, control may continue with 540.

At 540, the power control module 324 may determine whether the closure 204 is fully closed. For example, the power control module 324 may determine the first and second signals 224 and 232 are in the second state. If 540 is false, control returns to 520 to continue cinching. If 540 is true, control may continue with 544.

At 544, the power control module 324 disconnects the cinching motor 236 from power. The timer module 304 resets and starts the closed period 312 incrementing. The profile module 328 may adjust the target profile 332 based on the profile of the current 280 while the closure 204 was last cinched closed.

At 548, the power control module 324 determines whether the closure 204 has opened. For example, the power control module 324 may determine whether the second signal 232 has transitioned to the first state. If 548 is false, control may remain at 548. If 548 is true, the timer module 304 may reset and start the open period 308 and store the closed period 312 at 552, and control may return to 504.

While the example of a target current profile is discussed herein, the present application is also applicable to the use of other parameters of the motor, such as a target speed profile or a target temperature profile. Adjustments may be applied as described above, and a speed or temperature of the motor may be compared with the target speed or temperature profile during cinching.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cinching system of a vehicle, comprising:

a profile module configured to determine a first time series of target values for cinching a closure of the vehicle closed;

an adjustment module configured to determine an adjustment value based on at least one operating parameter, wherein the operating parameter includes at least one of (a) a number of cinches of the closure previously performed, (b) a period that the closure was fully open prior to the closure being partially closed, and (c) a period that the closure was fully closed prior to being opened before the partial closure;

an adjusting module configured to generate a second time series of target values for cinching of the closure by adjusting at least one of the target values of the first time series based on the adjustment value; and a power control module configured to:

apply power to a cinching motor when the closure is partially closed, wherein the cinching motor is configured to cinch and fully close the closure; and based on a comparison of a measured value of the cinching motor and one of the target values of the second time series, selectively one of:

decrease power applied to the cinching motor; and disconnect the cinching motor from power.

2. The cinching system of claim 1, wherein the power control module is configured to decrease power applied to the cinching motor when the measured value of the cinching motor is greater than the one of the target values of the second time series by at least a first predetermined amount.

3. The cinching system of claim 2, wherein the power control module is configured to disconnect the cinching motor from power when the measured value of the cinching motor is greater than the one of the target values of the second time series by at least a second predetermined amount.

4. The cinching system of claim 3, wherein the second predetermined amount is greater than the first predetermined amount.

5. The cinching system of claim 1, wherein the adjustment module is configured to determine the adjustment value further based on a temperature of the cinching motor.

6. The cinching system of claim 5, wherein the adjustment module is configured to increase the adjustment value as the temperature increases.

7. The cinching system of claim 1, wherein the adjustment module is configured to determine the adjustment value further based on an orientation of the vehicle.

8. The cinching system of claim 7, wherein the adjustment module is configured to increase the adjustment value when the orientation is indicative of the cinching being uphill.

9. The cinching system of claim 1, wherein the adjustment module is configured to determine the adjustment value further based on a temperature within the vehicle.

10. The cinching system of claim 9, wherein the adjustment module is configured to increase the adjustment value as the temperature increases.

11. The cinching system of claim 1, wherein the adjustment module is configured to determine the adjustment value further based on a temperature outside of the vehicle.

12. The cinching system of claim 11, wherein the adjustment module is configured to increase the adjustment value as the temperature increases.

13. The cinching system of claim 1, wherein the operating parameter includes the number of cinches of the closure previously performed.

14. The cinching system of claim 13, wherein the adjustment module is configured to decrease the adjustment value as the number of cinches increases.

15. The cinching system of claim 1, wherein the operating parameter includes the period that the closure was fully open prior to the closure being partially closed.

16. The cinching system of claim 15, wherein the adjustment module is configured to increase the adjustment value as the period that the closure was open increases.

17. The cinching system of claim 1, wherein the operating parameter includes the period that the closure was fully closed prior to being opened before the partial closure.

18. The cinching system of claim 17, wherein the adjustment module is configured to decrease the adjustment value as the period that the closure was closed increases.

19. The cinching system of claim 1, wherein the closure is one of a trunk panel, a door, and a hatch of the vehicle.

20. A cinching method for a vehicle, comprising:

determining a first time series of target values for cinching a closure of the vehicle closed;

determining an adjustment value based on at least one operating parameter, wherein the operating parameter includes at least one of (a) a number of cinches of the closure previously performed, (b) a period that the closure was fully open prior to the closure being partially closed, and (c) a period that the closure was fully closed prior to being opened before the partial closure;

generating a second time series of target values for cinching of the closure by adjusting at least one of the target values of the first time series based on the adjustment value;

applying power to a cinching motor when the closure is partially closed, wherein the cinching motor is configured to cinch and fully close the closure; and based on a comparison of a measured value of the cinching motor and one of the target values of the second time series, selectively one of:

decreasing power applied to the cinching motor; and disconnecting the cinching motor from power.

* * * * *